(12) United States Patent
Hattori et al.

(10) Patent No.: US 6,651,505 B2
(45) Date of Patent: Nov. 25, 2003

(54) PRESSURE DETECTING APPARATUS

(75) Inventors: Masakazu Hattori, Gifu (JP); Tsutomu Yasui, Gifu (JP)

(73) Assignee: Teijin Seiki Co., Ltd., Tokyo (JP)

( * ) Notice: Subject to any disclaimer, the term of this patent is extended or adjusted under 35 U.S.C. 154(b) by 0 days.

(21) Appl. No.: 09/825,454

(22) Filed: Apr. 3, 2001

(65) Prior Publication Data

US 2001/0042411 A1 Nov. 22, 2001

(30) Foreign Application Priority Data

Apr. 5, 2000 (JP) .................................... P2000-103262

(51) Int. Cl.[7] ................................................ G01L 9/00
(52) U.S. Cl. .............................. 73/717; 73/706; 73/718
(58) Field of Search .......................... 73/706, 717, 718, 73/721–724

(56) References Cited

U.S. PATENT DOCUMENTS

| 4,685,336 A | * | 8/1987 | Lee ................................ 73/715 |
| 5,092,178 A | | 3/1992 | Vanderlaan |
| 5,774,056 A | * | 6/1998 | Berry et al. ................. 340/607 |
| 5,942,692 A | * | 8/1999 | Haase et al. .................. 73/724 |

FOREIGN PATENT DOCUMENTS

| EP | 0 913 677 A | 5/1999 |
| JP | 5-60257 | 9/1993 |
| JP | 10-214715 | 8/1998 |
| JP | 2000-9571 | 1/2000 |

* cited by examiner

*Primary Examiner*—Edward Lefkowitz
*Assistant Examiner*—Jermaine Jenkins
(74) *Attorney, Agent, or Firm*—Akin, Gump, Strauss, Hauer & Feld, L.L.P.

(57) ABSTRACT

A pressure detecting apparatus includes: a housing (11) for forming fluid chambers (21A and 21B) into which external fluid pressures are imported respectively; a pressure-receiving member (31) slidably provided in the housing (11) for receiving the fluid pressures from the fluid chambers (21A and 21B); an elastic member (35) supported by the housing (11) and elastically deformed due to a slide displacement of the pressure-receiving member (31) from a predetermined position; a displacement detecting means (12) for detecting the displacement of the pressure-receiving member (31) from the predetermined position; the elastic member including a base portion supported by the housing, an engagement portion engaged with the pressure-receiving member, and a flexible arm extending from the base portion toward the engagement portion along a plane approximately perpendicular to a direction of sliding of the pressure-receiving member.

9 Claims, 3 Drawing Sheets

PRESSURE DETECTING APPARATUS

BACKGROUND OF THE INVENTION

The present invention relates to a pressure detecting apparatus for detecting fluid pressure by converting the fluid pressure into a displacement of a pressure-receiving member and particularly relates to a pressure detecting apparatus adapted for detection of differential pressure between fluid chambers.

In the background art, there is a pressure detecting apparatus in which fluid pressure is converted into a displacement of a pressure-receiving member to thereby ensure detection accuracy and the apparatus is made adapted to a required environmental condition in use. In a remarkably changeable condition such as that of an aircraft flight control system requiring high reliability in a wide temperature range, the pressure detecting apparatus of this type is used versatilely because it is practically difficult to use a general pressure sensor for detecting differential pressure while satisfying such a requirement for reliability.

FIG. 3 is a view showing the pressure detecting apparatus of this type in the background art. The pressure detecting apparatus is formed as a differential pressure detecting apparatus. In the apparatus, two oil pressures from two oil chambers 2A and 2B in a housing 1 are received by a slidable pressure-receiving shaft member 3 from its axially opposite end sides. As a result, the pressure-receiving shaft member 3 is axially displaced due to difference between the two values of pressure received by the pressure-receiving shaft member 3. Thus, the displacement of the pressure-receiving shaft member 3 is detected by a highly reliable LVDT (differential transformer) 4.

In the background-art pressure detecting apparatus, however, coiled spring type urging means 5A and 5B for urging the pressure-receiving shaft member 3 toward a neutral position were provided on opposite sides which were in the housing 1 and on the same axial line as that of the pressure-receiving member 3. The urging means 5A and 5B were complex and high in cost because they contained a large number of parts such as spring seats, etc. Moreover, the LVDT 4 was disposed in an apparatus end portion in the axial direction of the pressure-receiving shaft member 3 because of the necessity for ensuring the required spring characteristic. Hence, the apparatus size in the direction of the axial length of the pressure-receiving shaft member 3 was increased. There was a problem that it was difficult to reduce the size of the apparatus.

Moreover, there was a possibility that differential pressure might be detected inaccurately because spring seat portions and coiled springs constituting the urging members 5A and 5B abutted against the inner wall of the housing. There was also a problem in reliability.

Such problems were more remarkable in the case where a pair of pressure detecting apparatuses not prepared for detection of differential pressure were used for detecting differential pressure between a pair of fluid chambers. Even in the aforementioned pressure detecting apparatus used singly, the same problem as described above still occurred because the aforementioned coiled spring type urging means were used in the apparatus.

SUMMARY OF THE INVENTION

Therefore, an object of the present invention is to provide a pressure detecting apparatus easily reduced in size and high in reliability.

In order to achieve the above object, according to the present invention, there is provided a pressure detecting apparatus comprising: a housing forming at least one fluid chamber into which external fluid pressure is imported; a pressure-receiving member slidably provided in the housing so that the pressure-receiving member moves when the pressure-receiving member receives the fluid pressure in the fluid chamber; an elastic member supported by the housing and engaged with the pressure-receiving member so that the elastic member is elastically deformed due to a slide displacement of the pressure-receiving member from a predetermined position; a displacement detecting system which detects the displacement of the pressure-receiving member from the predetermined position; and the elastic member including a base portion supported by the housing, an engagement portion engaged with the pressure-receiving member, and a flexible arm extending from the base portion toward the engagement portion along a plane approximately perpendicular to a direction of sliding of the pressure-receiving member.

According to this aspect of the present invention, the elastic member includes a flexible arm extending along a plane approximately perpendicular to the direction of sliding of the pressure-receiving member. Hence, urging means such as elastic members for making the pressure-receiving member displaced due to the received pressure and for generating restoring force to a predetermined position from the displacement of the pressure-receiving member need not be disposed on one side or opposite sides in the direction of sliding of the pressure-receiving member. Hence, the apparatus length in the direction of sliding of the pressure-receiving member can be shortened, so that the size of the apparatus can be reduced easily. Moreover, there is no fear that such an elastic member for urging the pressure-receiving member may slidably abut against the inner wall of the housing. Hence, pressure detection accuracy is not spoiled, so that reliability becomes high.

Incidentally, the flexible arm extending along a plane approximately perpendicular to the direction of sliding of the pressure-receiving member means a flexible arm along a plane approximately perpendicular to the sliding direction. The flexible arm need not be straight, and maybe curved. The flexible arm may be a plate-like elastic material, but is not limited thereto. The direction of sliding of the pressure-receiving member need not be linear but may be curved circumferentially.

According to the present invention, there is further provided a pressure detecting apparatus for detecting differential pressure between two fluid chambers into which fluids are imported respectively, the apparatus comprising: a housing for forming the two fluid chambers; a pressure-receiving member provided slidably in the housing so that the pressure-receiving member moves from one of the fluid chambers to the other of the fluid chambers due to differential pressure between the two fluid chambers; an elastic member supported by the housing and engaged with the pressure-receiving member so as to be elastically deformed due to a slide displacement, of the pressure-receiving member, from a predetermined position; a displacement detecting means for detecting the displacement of the pressure-receiving member, from the predetermined position; and the elastic member including a base portion supported by the housing, an engagement portion engaged with the pressure-receiving member, and a flexible arm extending from the base portion toward the engagement portion along a plane approximately perpendicular to a direction of sliding of the pressure-receiving member.

According to this aspect of the present invention, the elastic member includes a flexible arm extending along a plane approximately perpendicular to the direction of sliding of the pressure-receiving member. Hence, the elastic members for making the pressure-receiving member displaced due to the received pressure and for generating restoring force to a predetermined position from the displacement of the pressure-receiving member need not be disposed on opposite sides in the direction of sliding of the pressure-receiving member. Hence, the apparatus length in the direction of sliding of the pressure-receiving member can be shortened on a large scale, so that the size of the apparatus can be reduced easily. Moreover, there is no fear that such an elastic member for urging the pressure-receiving member may slidably abut against the inner wall of the housing. Hence, differential pressure detection accuracy is not spoiled, so that reliability becomes high.

Preferably, the elastic member includes an eddy-like flexible arm extending from the base portion to the engagement portion. Further preferably, the elastic member includes a plurality of eddy-like flexible arms eddying in one and the same direction with the base portion as two ends, the plurality of flexible arms being connected to one another at the engagement portion.

More preferably, the pressure detecting apparatus is configured so that the elastic member is made of a leaf spring supported by the housing in an outer circumferential portion. According to this configuration, the elastic member can be produced easily. Further, when the elastic member is supported by the housing in one of the fluid chambers, the pressure detecting apparatus can be small-sized further preferably. It is a matter of course that the elastic member may be disposed in the housing but in an inner space separated from the fluid chambers.

The present disclosure relates to the subject matter contained in Japanese patent application No. 2000-103262 (filed on Apr. 5, 2000), which is expressly incorporated herein by reference in its entirety.

DESCRIPTION OF THE PREFERRED EMBODIMENT

A preferable embodiment of the present invention will be described below with reference to the drawings.

Figure 1:
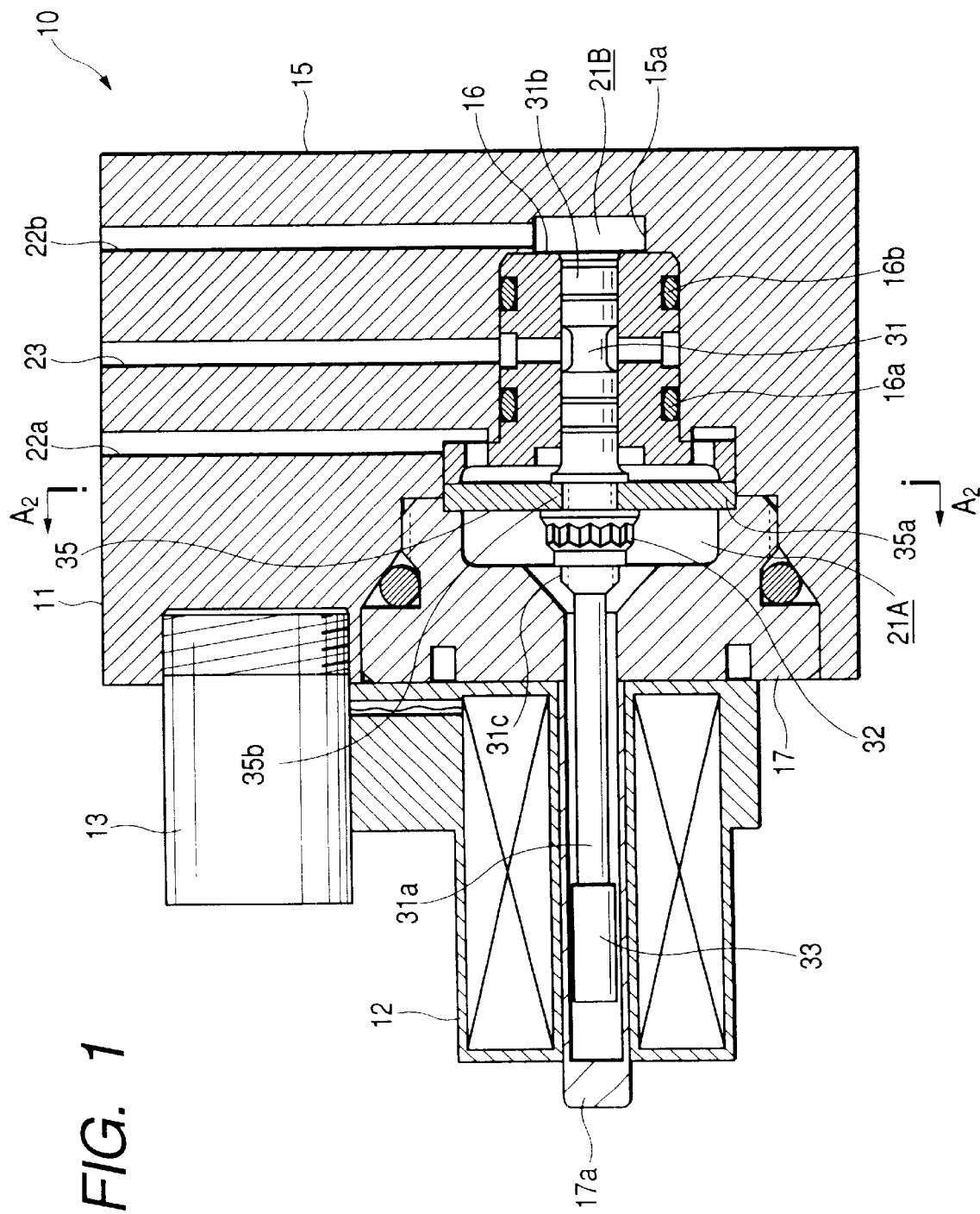
FIG. 1 is a frontal sectional view of a pressure detecting apparatus according to an embodiment of the present invention.
Figure 2:
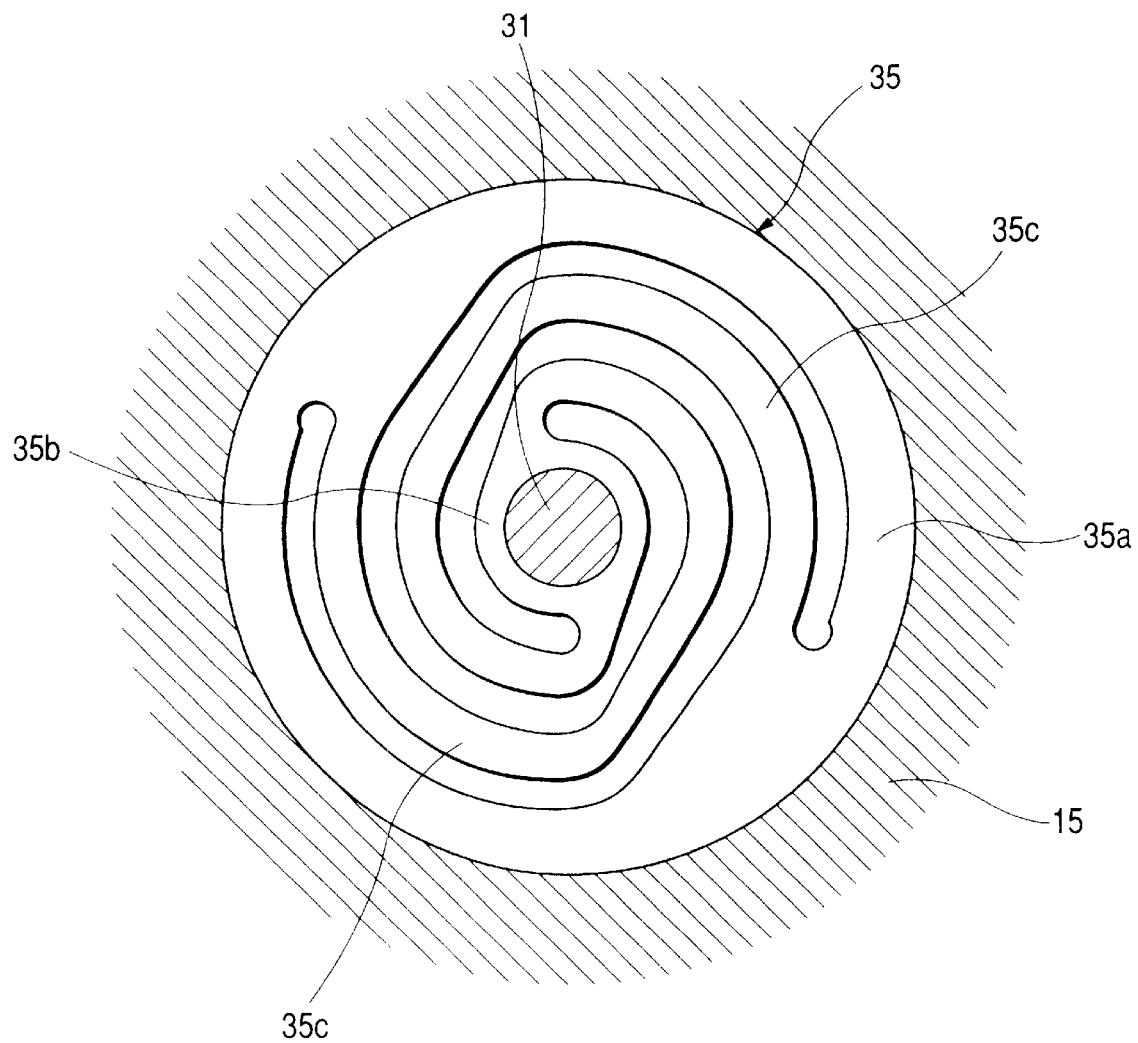
FIG. 2 is a partly side sectional view taken along the arrows A2—A2 in FIG. 1, showing the shape of the elastic member in the pressure detecting apparatus according to an embodiment of the present invention.
Figure 3:
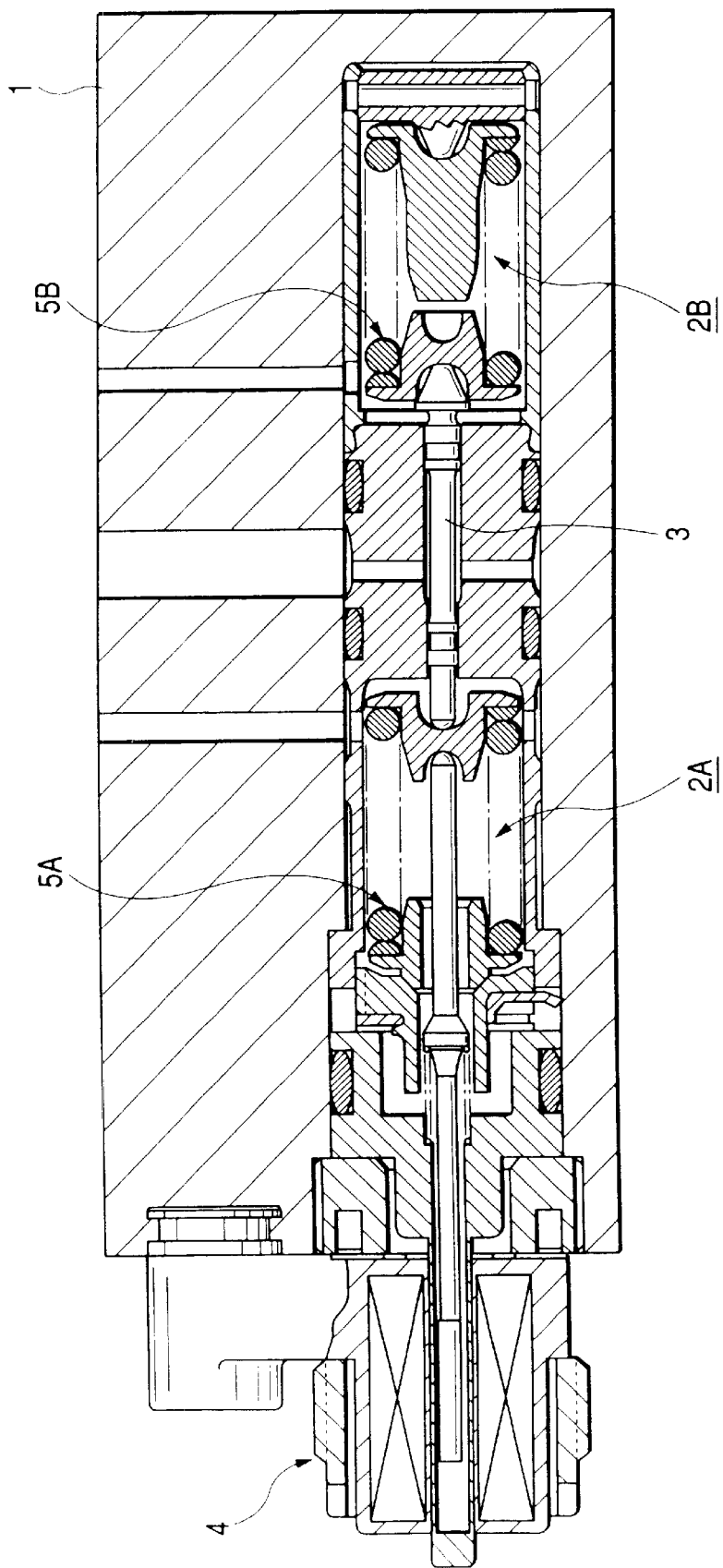
FIG. 3 is a frontal sectional view of a differential pressure detecting apparatus in the background art.

FIGS. 1 and 2 are views showing a pressure detecting apparatus according to an embodiment of the present invention and showing the example where the present invention is applied to a differential pressure detecting apparatus.

In FIG. 1, the reference numeral 10 designates a differential pressure detecting apparatus (pressure detecting apparatus) according to this embodiment. The differential pressure detecting apparatus 10 comprises a housing 11, a differential transformer 12 attached to the housing 11, and a connector 13 to which an external connector is removably connected to thereby electrically connect the differential transformer 12 to a position detecting circuit provided in the outside of the differential transformer 12.

The housing 11 includes: two fluid chambers 21A and 21B into which external fluids are imported respectively; passages 22a and 22b for importing the fluids into the fluid chambers 21A and 21B respectively; and a fluid discharge passage 23 by which leaking fluid can be discharged to the outside. The fluid importing passages 22a and 22b communicate with a pair of oil chambers (oil chambers divided by a piston), respectively, of an electric oil pressure servo actuator not shown in the drawing.

The housing 11 further includes: a body portion 15 in which the fluid importing passages 22a and 22b and the fluid discharge passage 23 are formed; a stepped round hole 15a formed in the body portion 15 so as to be perpendicular to the passages 22a, 22b and 23; a sleeve 16 covered with seal rings 16a and 16b and housed in the hole 15a to thereby divide the hole 15a into the two fluid chambers 21A and 21B; and a sealed plug 17 thread-engaged with the housing 11 to block the hole 15a in a neighborhood of an opening portion of the hole 15a. A bottomed cylindrical portion 17a is provided in the center portion of the plug 17 so as to protrude outward. The differential transformer 12 is attached to the outer surface side of the plug 17 so as to surround the bottomed cylindrical portion 17a.

Further, a pressure-receiving member 31 is slidably provided between the two fluid chambers 21A and 21B in the housing 11 so that the pressure-receiving member 31 moves in an axial direction or in a direction opposite to the axial direction in accordance with differential pressure between the two fluid chambers 21A and 21B. The pressure-receiving member 31 is shaped like a spool and axially slidably retained in the inside of the sleeve 16.

Further, a disc spring 35, which is an elastic member, is interposed between the pressure-receiving member 31 and the housing 11. The disc spring 35 is engaged with the pressure-receiving member 31 in such a manner that, when the disc spring 35 is elastically deformed or bent, the center portion of the disc spring 35 is displaced due to a sliding displacement of the pressure-receiving member 31 from a predetermined position (position shown in FIG. 1).

Further, a male thread is formed in an intermediate portion 31c of the pressure-receiving member 31 with which the disc spring 35 is engaged. The disc spring 35 is fastened to the intermediate portion 31c of the pressure-receiving member 31 by a nut 32. Further, a movable iron core 33 is attached to one end portion 31a of the pressure-receiving member 31. The movable iron core 33 forms a part of the differential transformer 12. That is, the differential transformer 12 serves as a displacement detecting means for detecting a displacement from a predetermined position of the pressure-receiving member 31 as a displacement of the movable iron core 33.

Incidentally, the disc spring 35 is made of a leaf spring material supported by the housing 11 in the outer circumferential portion. The disc spring 35 extends from a base portion 35a supported by the housing 11 toward an engagement portion 35b engaged with the pressure-receiving member 31 along a plane approximately perpendicular to the direction of sliding of the pressure-receiving member 31.

More specifically, as shown in FIG. 2, the disc spring 35 has a plurality of eddy-like flexible arms 35c eddying in one and the same direction with the base portion 35a which is supported by the housing 11 and which serves as two ends of the arms. The plurality of flexible arms 35c are connected to each other in the annular engagement portion 35b engaged with the pressure-receiving member 31. Although FIG. 2 shows the example where a pair of flexible arms 35c are provided in positional relation of 180° rotation, it is a matter of course that the invention may be applied also to the case where three or more flexible arms are provided.

In the differential pressure detecting apparatus 10 configured thus according to this embodiment, the disc spring 35 has the flexible arms 35c extending from the base portion 35a supported by the housing 11 toward the engagement portion 35b engaged with the pressure-receiving member 31 along a plane (a virtual plane in this embodiment) approximately perpendicular to the direction of sliding of the pressure-receiving member 31. Hence, when a thrust force proportional to a difference between two values of pressure received from the fluid chambers 21A and 21B, that is, a thrust force proportional to differential pressure between the two fluid chambers 21A and 21B, is generated in the pressure-receiving member 31, the disc spring 35 is bent by the thrust force and, at the same time, the pressure-receiving member 31 is slidably displaced by the differential pressure.

Hence, complex urging means as required in the background art need not be disposed on one side or on opposite sides in the direction of sliding of the pressure-receiving member 31. The length of the differential pressure detecting apparatus 10 in the direction of sliding of the pressure-receiving member 31 can be reduced, so that the size of the apparatus can be reduced easily. Moreover, there is no fear that the disc spring 35 for urging the pressure-receiving member 31 toward a predetermined position may slidably abut against the inner wall of the housing 11. Hence, pressure detection accuracy is not spoiled by unnecessary interference between such members, so that reliability of the differential pressure detecting apparatus 10 becomes high.

Further, the disc spring 35 is supported in one fluid chamber 21A by the housing 11. Hence, the size of the apparatus can be reduced compared with the case where a space for arrangement of the disc spring 35 is provided separately. It is a matter of course that the disc spring 35 may be disposed in the housing 11 and in an inner space separated from the fluid chambers 21A and 21B.

Incidentally, when differential pressure is detected, the fluid pressure in the one fluid chamber 21A acts on the opposite surfaces of a portion (mainly the disc spring 35) outer than the diameter of a sliding portion of the other end portion 31b of the pressure-receiving member 31. As a result, such two types fluid pressure acting on the opposite surfaces cancel each other. Hence, a thrust force corresponding to differential pressure between the two fluid chambers 21A and 21B is generated in the pressure-receiving member 31 on the basis of the fluid pressure acting on a portion (the nut 32 and the movable ion core 33) which is inner than the diameter of the sliding portion of the pressure-receiving member 31 and exposed to the one fluid chamber 21A and the fluid pressure acting on the other end portion 31b which is inner than the diameter of the sliding portion of the pressure-receiving member 31 and exposed to the other fluid chamber 21B.

Although the aforementioned embodiment has shown the example where a flat eddy-like flexible arm 35c along a plane approximately perpendicular to the direction of sliding of the pressure-receiving member 31 is used as the flexible arm extending along a plane approximately perpendicular to the direction of sliding of the pressure-receiving member 31, a straight single flexible arm or a plurality of straight flexible arms extending in the direction of the radius (radially outward) of the pressure-receiving member 31 may be used as the flexible arm and the flexible arm is not always limited to such a plate-like elastic material. That is, a plurality of rod-like elastic bodies along a plane approximately perpendicular to the direction of sliding of the pressure-receiving member 31 may be used as the flexible arm.

Although the aforementioned embodiment has shown the case where the pressure-receiving member 31 is shaped like a spool and linearly slid in the axial direction, it may be conceived that the pressure-receiving member is provided as a rotation type pressure-receiving member which has a pair of receiving surfaces opposite to each other in the direction of rotation thereof and which rotates (makes reciprocating motion along a circular arc orbit) in accordance with the difference between two kinds of pressure received from the pressure-receiving surfaces.

In the aforementioned embodiment, further, configuration may be made so that fluid cannot be imported into one of the fluid importing passages 22a and 22b. According to this configuration, the pressure detecting apparatus can be formed as a pressure detector which makes the pressure-receiving member 31 displaced not in response to differential pressure but in response to fluid pressure of a single fluid chamber. In this case, for example, the fluid chamber 21B and the fluid importing passage 22b can be omitted, so that greater reduction in size of the apparatus can be attained.

According to the present invention, the elastic member has a flexible arm extending along a plane approximately perpendicular to the direction of sliding of the pressure-receiving member. Hence, means for making the pressure-receiving member displaced due to the received pressure and for generating restoring force to a predetermined position from the displacement of the pressure-receiving member need not be disposed on opposite sides in the direction of sliding of the pressure-receiving member. Hence, the apparatus length in the direction of sliding of the pressure-receiving member can be shortened, so that reduction in size of the apparatus can be attained. Moreover, the problem that differential pressure accuracy is spoiled because such an elastic member for urging the pressure-receiving member to a predetermined position slidably abuts against the inner wall of the housing can be solved securely. Accordingly, reliability of the pressure detecting apparatus becomes high. As a result, a pressure detecting apparatus which can be easily reduced in size and which is high in reliability can be provided.

We claim:

1. A pressure detecting apparatus comprising:
   a housing forming a fluid chamber into which external fluid pressure is imported;
   a pressure-receiving member slidably provided in said housing so that said pressure-receiving member moves when said pressure-receiving member receives said fluid pressure in said fluid chamber;
   an elastic member supported by said housing and engaged with said pressure-receiving member so that said elastic member is elastically deformed due to a slide displacement of said pressure-receiving member from a predetermined position;
   a displacement detecting device which detects said displacement of said pressure-receiving member from said predetermined position; and
   said elastic member including a base portion supported by said housing, an engagement portion engaged with said pressure-receiving member, and a plurality of flexible arms, each of the plurality of flexible arms extending from said base portion toward said engagement portion along a plane approximately perpendicular to a direction of sliding of said pressure-receiving member, each flexible arm forming a portion of the elastic member intersectable by a straight line connecting a center of the engagement portion to a junction between the base portion, each flexible arm extending for substantially one turn about the center of the engagement portion from the base portion to the engagement portion and each flexible arm extending in the same direction and extending from respective different parts of said base portion to said engagement portion in an overlapping arrangement.

2. A pressure detecting apparatus according to claim 1, wherein said elastic member is made of a leaf spring having a circumferential portion supported by said housing.

3. A pressure detecting apparatus according to claim 1, wherein said elastic member is supported by said housing in said fluid chamber.

4. A pressure detecting apparatus for detecting differential pressure between two fluid chambers into which fluids are imported respectively, said apparatus comprising:

a housing for forming said two fluid chambers;

a pressure-receiving member provided slidably in said housing so that said pressure-receiving member moves from one of said fluid chambers to the other of said fluid chambers in accordance with differential pressure between said two fluid chambers;

an elastic member supported by said housing and engaged with said pressure-receiving member so as to be elastically deformed due to a slide displacement, of said pressure-receiving member, from a predetermined position;

a displacement detecting device which detects said displacement of said pressure-receiving member, from said predetermined position; and said elastic member including a base portion supported by said housing, an engagement portion engaged with said pressure-receiving member, and a plurality of flexible arms, each of the plurality of flexible arms extending from said base portion toward said engagement portion alone a plane approximately perpendicular to a direction of sliding of said pressure-receiving member, each flexible arm forming a portion of the elastic member intersectable by a straight line connecting a center of the engagement portion to a junction between the base portion, each flexible arm extending for substantially one turn about the center of the engagement portion from the base portion to the engagement portion and each flexible arm extending in the same direction and extending from respective different parts of said base portion to said engagement portion in an overlapping arrangement.

5. A pressure detecting apparatus according to claim 4, wherein said elastic member is made of a leaf spring having a circumferential portion supported by said housing.

6. A pressure detecting apparatus according to claim 4, wherein said elastic member is supported by said housing in said fluid chamber.

7. A pressure detecting apparatus for detecting differential pressure between two fluid chambers into which fluids are imported respectively, said apparatus comprising:

a housing for forming said two fluid chambers;

a pressure-receiving member provided slidably in said housing so that said pressure-receiving member moves from one of said fluid chambers to the other of said fluid chambers in accordance with differential pressure between said two fluid chambers;

an elastic member supported by said housing and engaged with said pressure-receiving member so as to be elastically deformed due to a slide displacement, of said pressure-receiving member, from a predetermined position;

a displacement detecting device which detects said displacement of said pressure-receiving member, from said predetermined position; and said elastic member including a base portion supported by said housing, an engagement portion engaged with said pressure-receiving member, and a plurality of flexible arms, each of the plurality of flexible arms having a first end proximate the base portion and a second end proximate the engagement portion, each flexible arm within a plane approximately perpendicular to a direction of sliding of said pressure-receiving member, the first and second ends respectively defining first and second radii extending outwardly from a center of the engagement portion, the first and second radii defining a sector having a central angle greater than one hundred eighty degrees (180°), each flexible arm entirely within the sector, wherein said central angle extends for substantially one turn about the center of the engagement portion from the base portion to the engagement portion and each flexible arm extending in the same direction and extending from respective different parts of said base portion to said engagement portion in an overlapping arrangement.

8. A pressure detecting apparatus according to claim 7, wherein said elastic member is made of a leaf spring having a circumferential portion supported by said housing.

9. A pressure detecting apparatus according to claim 7, wherein said elastic member is supported by said housing in said fluid chamber.

* * * * *